United States Patent [19]

Sou

[11] Patent Number: 4,815,174
[45] Date of Patent: Mar. 28, 1989

[54] SETTING DEVICE FOR ROPES

[76] Inventor: Teho Sou, Higashiimazato 2-chome, 7-18, Osaka, Japan

[21] Appl. No.: 107,459

[22] Filed: Oct. 9, 1987

[30] Foreign Application Priority Data

| Oct. 29, 1986 | [JP] | Japan | 61-166154[U] |
| Nov. 14, 1986 | [JP] | Japan | 61-175812[U] |
| Nov. 28, 1986 | [JP] | Japan | 61-184786[U] |
| Dec. 11, 1986 | [JP] | Japan | 61-190776[U] |
| Feb. 10, 1987 | [JP] | Japan | 62-18472[U] |
| Apr. 17, 1987 | [JP] | Japan | 62-59066[U] |

[51] Int. Cl.$^4$ .................... A44B 11/10; F16G 11/04
[52] U.S. Cl. .................... 24/136 R; 24/171; 403/211
[58] Field of Search ............ 24/136 B, 136 R, 136 K, 24/136 L, 115 M, 171, 181, 194; 403/211; 248/205.3

[56] References Cited

U.S. PATENT DOCUMENTS

| 399,027 | 3/1889 | Frank | 24/136 R |
| 992,273 | 5/1911 | Singer | 24/136 R |
| 2,066,049 | 12/1936 | Passek | 24/136 R |
| 2,377,287 | 5/1945 | White et al. | 24/171 |
| 2,838,819 | 6/1958 | Falkenstein | 403/211 |
| 3,848,571 | 11/1974 | Pearson et al. | 403/211 |
| 3,893,210 | 7/1975 | Hildebrandt | 24/194 |
| 3,903,785 | 9/1975 | Pepper, Jr. | 24/136 B |
| 4,457,053 | 7/1984 | Niwa | 248/205.3 |

FOREIGN PATENT DOCUMENTS

| 982787 | 2/1976 | Canada | 24/136 L |
| 1087010 | 10/1967 | United Kingdom | 24/171 |

Primary Examiner—Victor N. Sakran
Attorney, Agent, or Firm—Wenderoth, Lind & Ponack

[57] ABSTRACT

A binding device for rope such as a belt for hanging a bag or a leash for tugging a pet. The rope is passed through into the setting hole of the binding means with a wedge so that the rope is fixedly pressed in the said hole.

8 Claims, 15 Drawing Sheets

SETTING DEVICE FOR ROPES

The present invention relates to binding devices for ropes such as, for example, a belt for hanging a case or a bag from shoulder or a leash for tugging a dog or other pets, etc.

Figure 30:
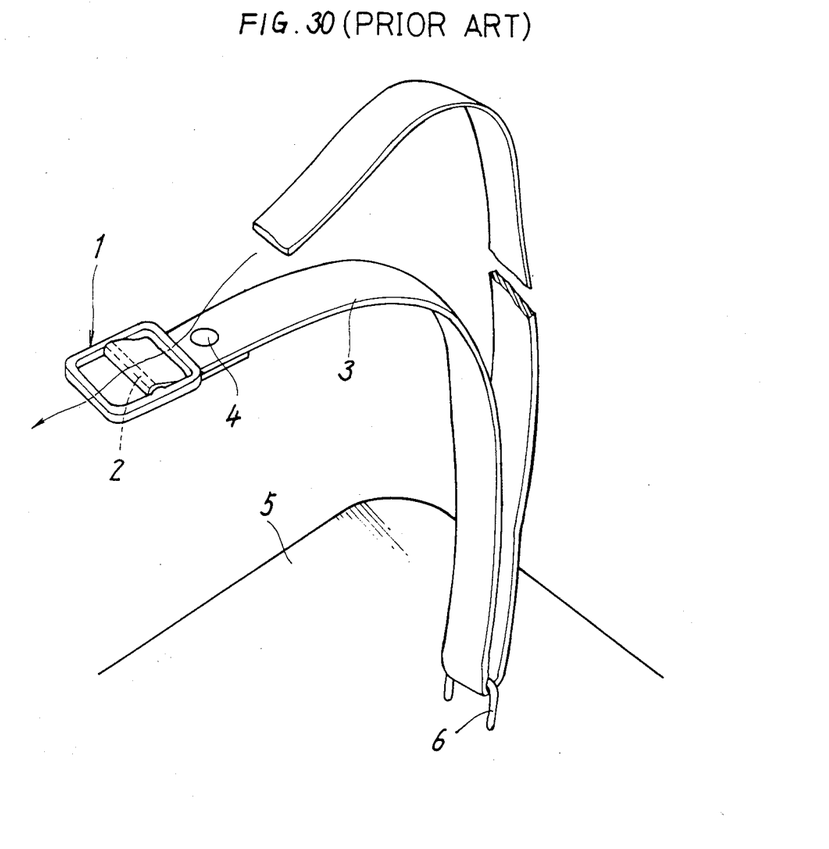

A belt for hanging a case or a bag is designed to be adjustable in length according to the user's body style, etc. FIG. 30 shows a conventional belt binding structure. In this figure, (1) denotes a rectangular frame shape binding means, which has a cross-linking piece (2) provided integrally therewith at its center. A band shape belt (3) has its end wound around the aforementioned cross-linking piece (2) and folded back, to be plied and fixed with a rivet at an intermediate part of the belt (3). The other end of the belt (3) is wound around a catch (6) of a case or a bag (5) and folded back therefrom; it is, then, passed through the binding means, running over the cross-linking piece around which its end has been attached and drawn out therefrom, to be fixed on another catch of the case or the bag (5). The belt passed through the binding means is immovably held in place by the friction between it and the binding means (1), but the part of the belt that has been passed therethrough may be slid thereon by loosening it from the binding means, thereby allowing its length to be adjusted.

Figure 31:
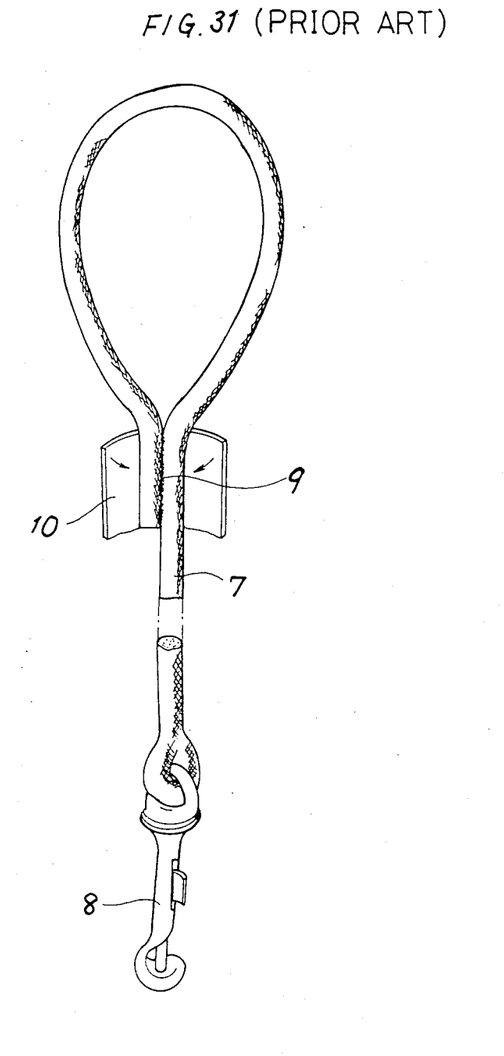

On the other hand, for a leash for tugging a dog of other pets, normally, a braided rope circular in section is used and for facility in traction, the rope's end part is looped to form a grip. FIG. 31 shows a conventional structure of such a leash. Thus in a leash (7) equipped integrally therewith at one end thereof with a connecting means (8) for its attachment to a dog's collar, the other end part is folded back in a loop shape, as shown in this figure, this end is plied on itself at the intermediate part of the leash (7) and this part is bonded (9) by means of heat sealing, etc. This structure is strong enough to tug small dogs which have only small pulling capacity, but with large dogs, there is a possibility that because of their large pulling capacity, the folded part can easily come apart from each other plies. Therefore, according to a conventional method, a sheet (10) made of leather is wound around this part and, then, the sheet (10) is sewed and so on, thereby ensuring further rigid holding of the aforementioned heat sealed part.

In the former of the conventional examples shown in the aforementioned FIGS. 30 and 31, one end of a belt (3) is wound around a cross-linking piece (2) of a binding means (1) and, then, fixed with a rivet (4). Accordingly, this conventional example always requires the procedure for fitting the rivet (4) for setting the end of the belt (3) and this operation necessitates a special machines and instruments, thus detracting from simple setting. On the other hand, the one shown in FIG. 31 similarly requires machines and instruments such as a heating apparatus, etc., for heat-sealing the end of the leash (7) and further, coating the bound part with a sheet (10) requires its sewing, thus greatly increasing the number of working steps.

Thus it is a first object of this invention to overcome the difficulties involved in setting on end of such a belt or a leash, etc.

A second object of this invention is to provide a rope binding device which permits easy setting of a rope without having to utilize any machines and instruments nor rely on any special techniques in setting the belt or leash.

Another object of this invention is to provide a rope setting device which enables easy setting of such a rope by applying a simple wedge to the end of the rope.

A still another object of this invention is to provide a binding device for a shoulder hanging belt for a case or a bag, etc., an example of a rope being in a band shape, in which one end of a belt is inserted through a setting hole and while a wedge is wrapped by its end, both the wedge and the belt end part are passed through the setting hole, thereby enabling easy binding of the end part.

A further object of this invention is to provide a rope binding device, so designed that one end of a rope, being a leash circular in section for a dog or other pets, is passed through a setting hole, a conical wedge is thrusted thereinto and, then, they are both simultaneously inserted into the setting hole, thereby enabling its easy binding without allowing its withdrawal.

Still other objects of this invention and various benefits that will be derived therefrom will be definitely understood from a description of its embodiments taken in conjunction with accompanying drawings:

Referring to these drawings:

FIG. 3 is a longitudinal sectional view of the binding means body;

Figure 1:
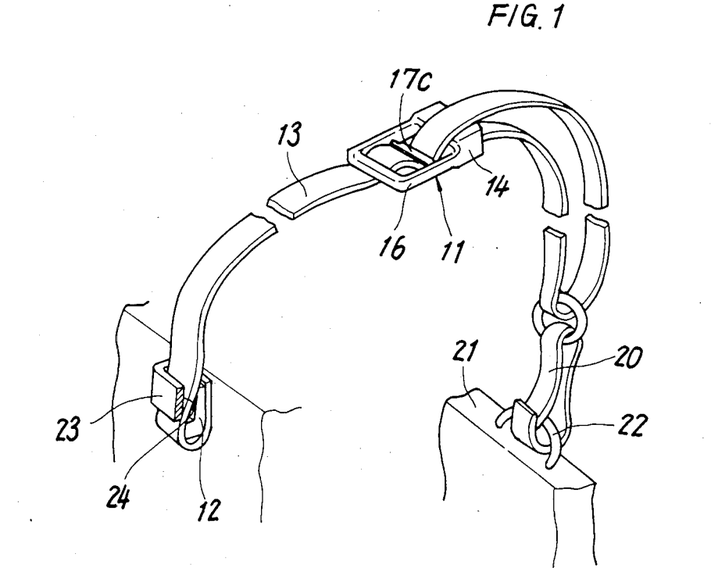
FIG. 1 is a perspective view of whole of a shoulder belt obtained according to this invention.
Figure 2:
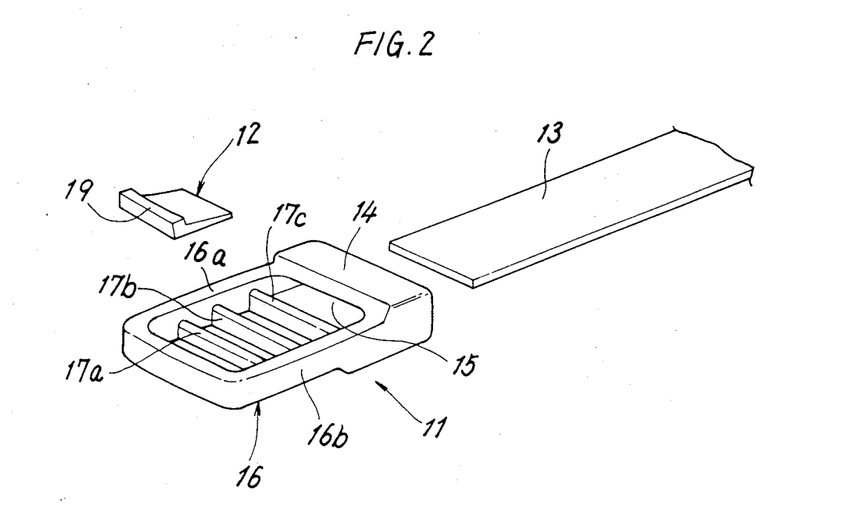
FIG. 2 is a disassembled perspective view of its binding means part.

Now, referring to FIGS. 1-3 showing a first embodiment of this invention, (11) denotes a binding means body, (12) a wedge, and (13) a belt; the binding means body is molded of a hard synthetic resin nearly in a rectangular frame shape. And through the setting portion (14) forming the base end part of the binding means, a belt setting hole (15) is formed piercing in the fore-aft direction. A frame shape part (16) is formed integrally with this setting portion (14) extending forward thereof, with a plurality of cross-linking pieces (17a), (17b) and (17c) formed at suitable intervals in the fore-aft direction between mutually facing sides (16a) (16b) of this frame shape part. The bottom portion of the cross-linking piece (17c) are coupled with the setting portion (14) at the bottom portion of the belt setting hole (15) through a plate shape guide piece (18).

The wedge (12) is formed of a similar hard synthetic resin as the aforementioned binding means body (11) in a tapered shape in section gradually sloping from a thick portion (19) at one end toward a thin portion at the other end.

The belt (13) is formed in a band shape, as shown in FIG. 1, whose material is not particularly specified.

Figure 4:
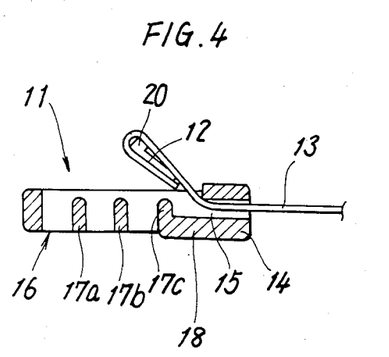
FIGS. 4–7 are longitudinal sectional views of an essential part of a binding means body showing the procedure for setting a belt in the binding means body and passing it therethrough.
Figure 5:
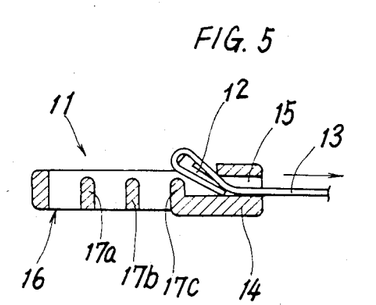
Figure 6:
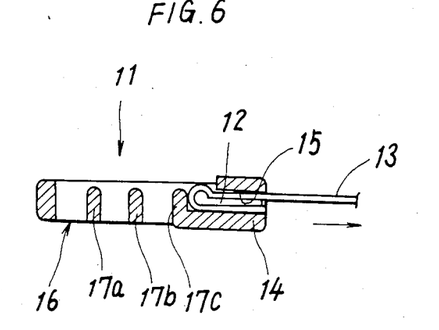

Describing the joining procedure of the belt (13) to the binding means body (11), with reference to FIG. 4 and the following figures: First, referring to FIG. 4, one end of a belt looped as shown in FIG. 1, after passed through a belt setting hole (15), is folded back and a wedge (12) is wrapped in the folded back portion. In this instance, the wedge (12) is so arranged that its thin side coinside with the folding back direction. In this state, the wedge (12), together with the folded back end of the belt (13), is inserted into the setting hole (15) and as the belt (13) is strongly pulled by gripping the other end side, then, as shown in FIG. 6, the wedge (12) is rigidly inserted in the setting hole (15), so that the belt (13) is strongly thrust on the inner wall of the setting hole (15) both on its upper and lower sides, to be held thereby, without allowing its withdrawal. Then the other end of the belt (13) folded back as shown in FIG. 1, after passed under the bottom side of the intermediate cross-linking piece (17b) from the top of the cross-linking piece (17c) on the setting portion (14) side, is skirted round over still another cross-linking piece (17a) and is again passed inside the frame portion (16), to be projected out therefrom.

Figure 7:
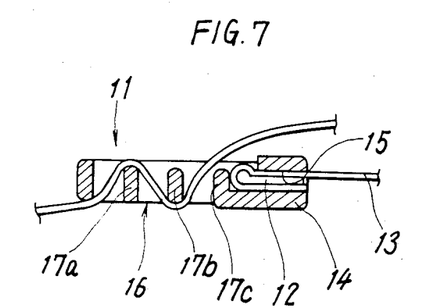

With the aforementioned structure, when a pulling force is exerted on the belt (13) in the direction of the arrow mark C, as shown in FIG. 6, a wedge (12) strongly presses the belt (13) onto the inside wall surface of the setting hole; consequently, the pressing force is further increased, resulting in rigid setting state. Since the other end of the belt (13) is jig-zagged through the frame shape part (16), as shown in FIG. 7, a frictional force is produced between the belt (13) and the cross-linking pieces (17a), (17b) and (17c), whereby the belt (13) is held in the specified place. And for adjusting the length of the belt (13), the adjustment shall be made, while slackening the belt (13) which has been passed under this frame part (16).

As shown in FIG. 1, the looped part of the belt (13) is provided with an engaging means (20); the engaging means (20) is releasably engaged with a catch (22) provided on a case or a bag (21).

And the end of the belt (13) which has come out, after passing under the frame part (16) is fixed in the setting hole (24) of a catch (23) as a binding means body by use of a similar wedge (12).

Figure 8:
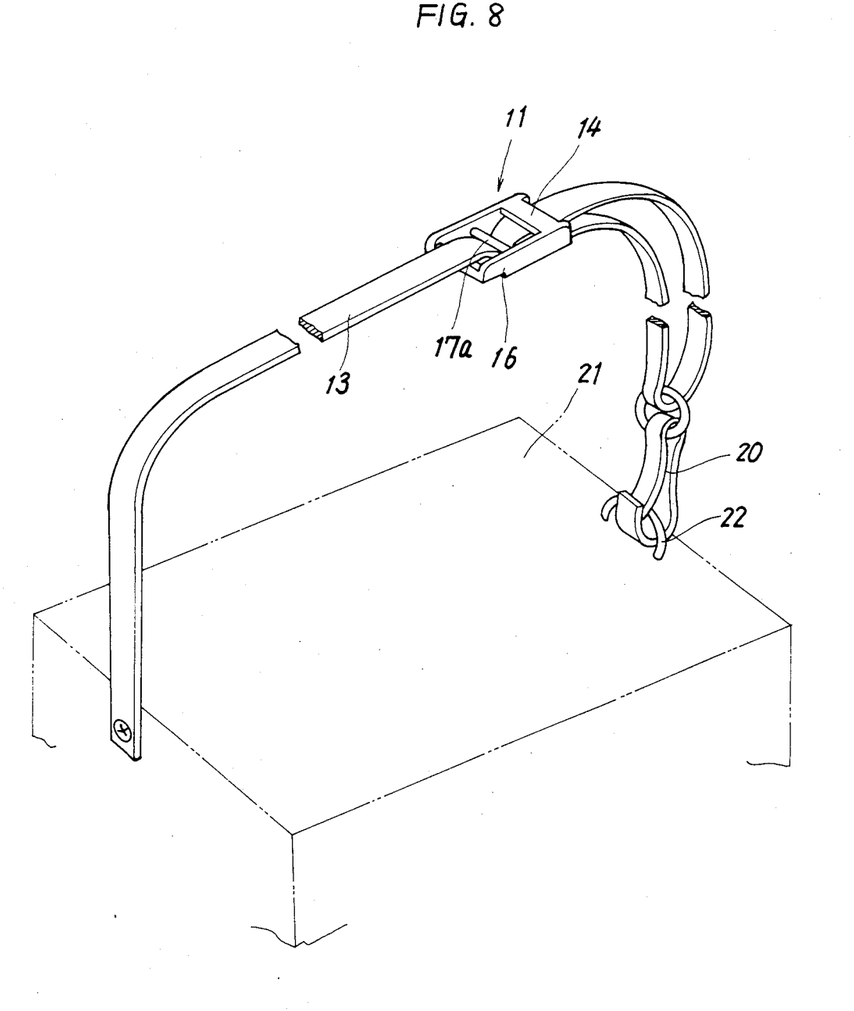
FIG. 8 is a perspective view of a shoulder belt showing another embodiment of this invention.
Figure 9:
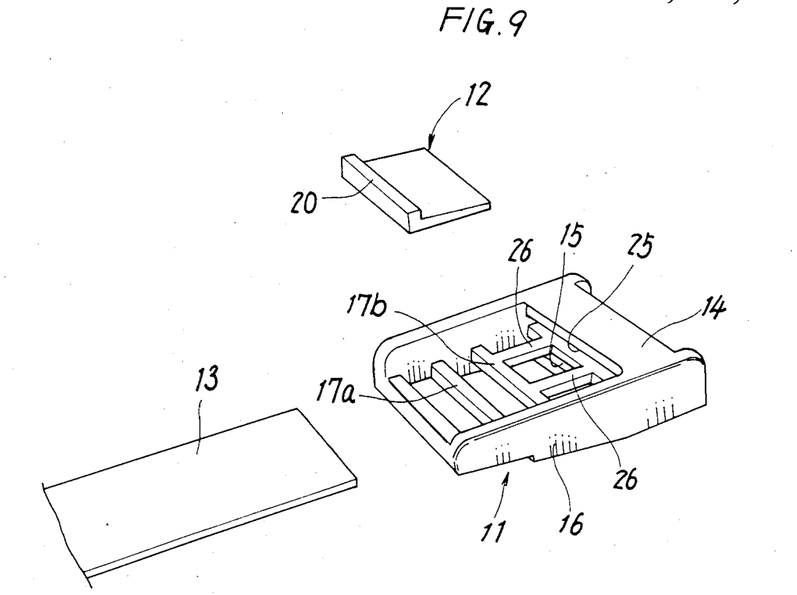
FIG. 9 is a disassembled perspective view of a binding means part used in an embodiment of FIG. 8.
Figure 10:
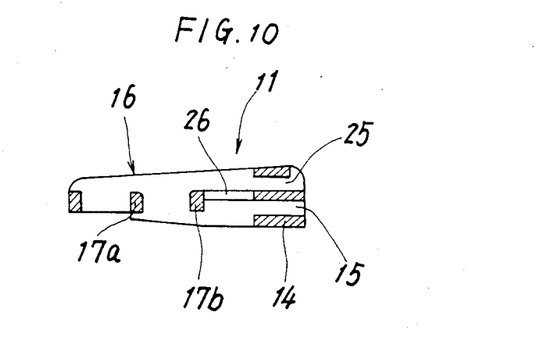
FIG. 10 is similarly a longitudinal sectional view of a binding means body used in the embodiment of FIG. 8.

FIGS. 8-10 show another embodiment of the belt or strap setting structure. In this embodiment, as shown in FIG. 10, a belt passing hole (25) is formed on the upper side of the belt or strap setting hole (15) and in parallel therewith. And straddling over the upper portion of the setting hole (15) of the setting portion (14) and the upper portion of the cross-linking piece (17b) on the setting portion (14) side, two right and left guide pieces (26) are formed integrally therewith.

Figure 11:
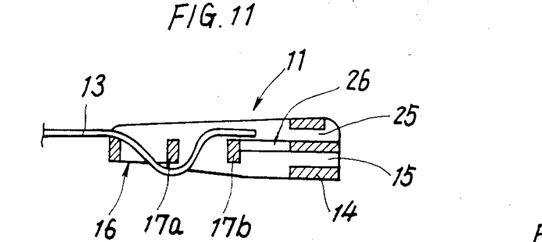
FIGS. 11–15 are longitudinal sectional view of the essential part of the belt binding means of the embodiment of FIG. 8, showing the procedure for fitting the belt thereinto.
Figure 12:
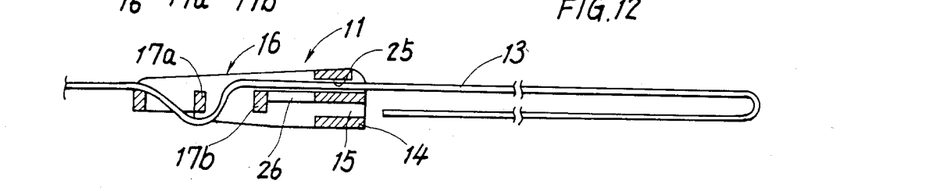
Figures 13, 14:
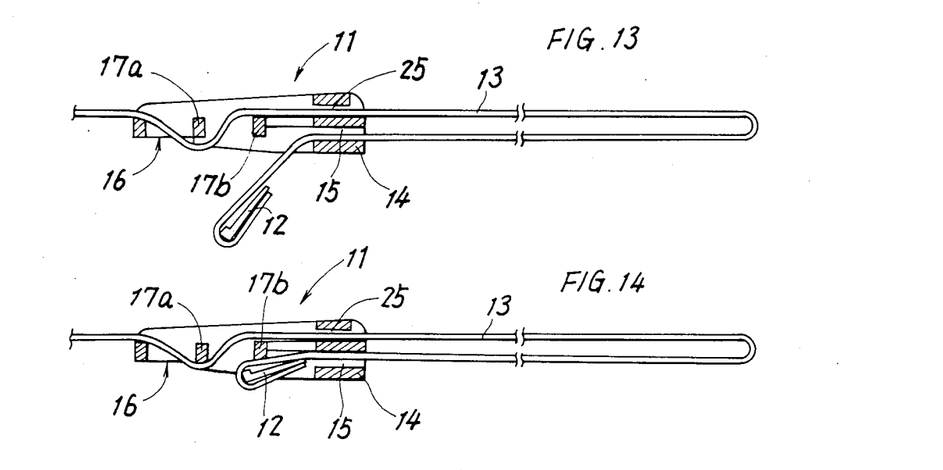
Figure 15:
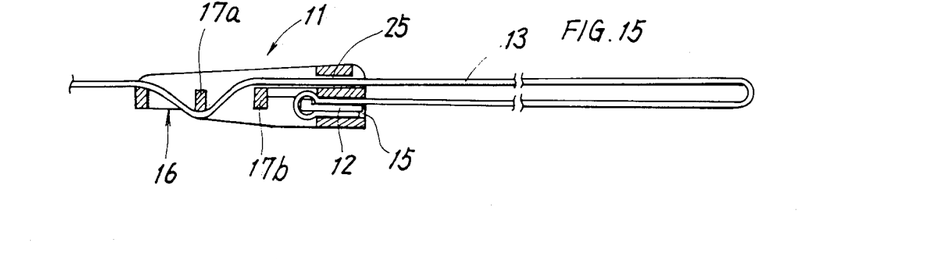

FIGS. 11-15 show the belt or strap setting procedure utilizing the binding means of this embodiment. First, as shown in FIG. 11, after passed zigzaggingly under the aforementioned cross-linking pieces (17a) (17b) in the frame part (16), is projected out to its upper side, passed through a belt passing hole (25), as shown in FIG. 12, and then, folded back in a loop shape. Thereafter, its end is passed through the setting hole (15), folded back to wrap a wedge (12) therein and, the folded back part is again inserted into the setting hole, as shown in FIG. 14; then, the end of the belt (13) is firmly set by strongly pulling it.

In this embodiment represented by the drawings following FIG. 8, the belt (13) which has been passed under the frame part (16), as hereabove-described, is further passed through a passing hole (25), whereby the frictional force on the belt (13) is further increased; not only its holding strength is increased, but the belt (13) which has been passed under the frame part (16) can be accommodated in the binding means in good shape, without allowing it to bulge largely outward or upward, as shown in these drawings. Further, when passing the belt (13) which has been passed under the frame part (16), its smooth passing through the passing hole (25) is ensured by letting it slide on the aforementioned guide pieces (26).

In each of the aforementioned embodiments, the wedge (12) is wrapped by folding back one end of the belt (13) and the belt is pressed by the wedge (12) on both upper and lower sides thereof, but the arrangement is not limited to this; the securing may be effected by pressing the belt (13) only from one side of the wedge (12), without folding back the end of the belt (13).

The belt or strap passing hole (25) can be formed on the lower side of the setting hole (15), contrarily to the arrangement of FIG. 2.

Figure 16:
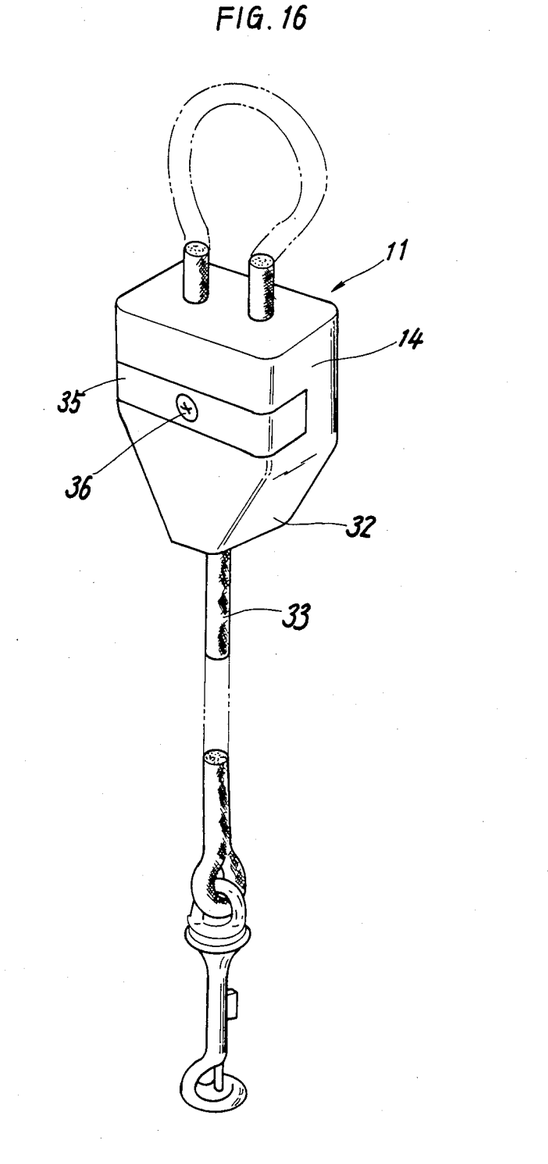
FIG. 16 is a perspective view of the essential part of an embodiment of this invention, as applied to a pet's leash.
Figure 17:
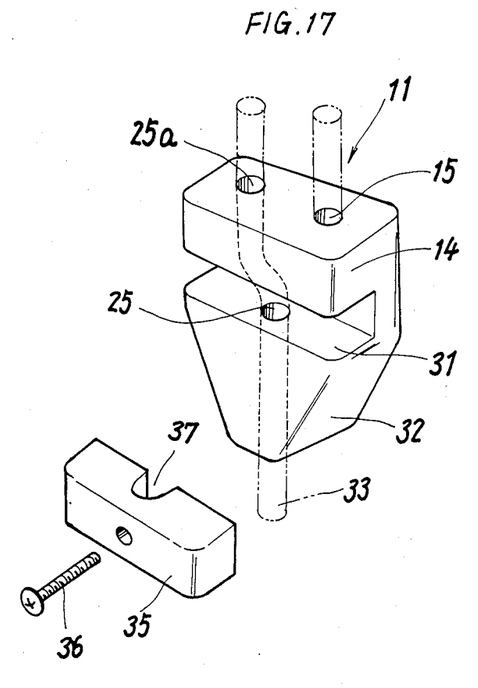
FIG. 17 is similarly a disassembled perspective view of the binding means of the embodiment of FIG. 16.
Figure 18:
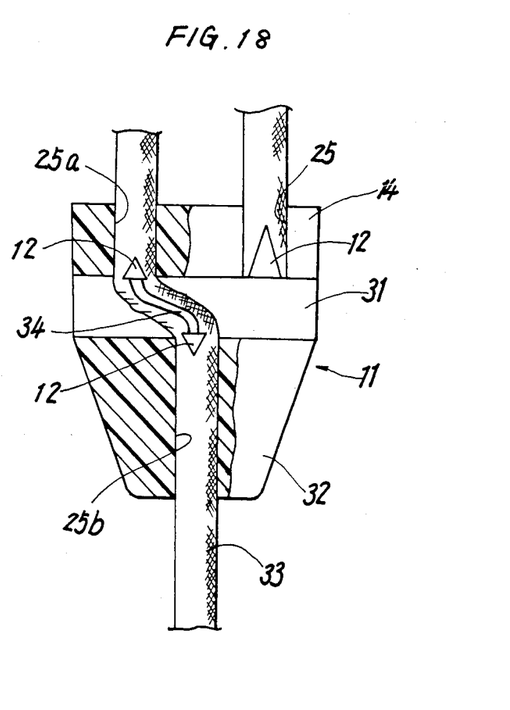
FIG. 18 is similarly a longitudinal sectional view of a binding means part.
Figure 19:
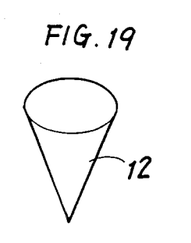
FIGS. 19 and 20 are perspective views of wedges used in this belt binding structure.
Figure 20:
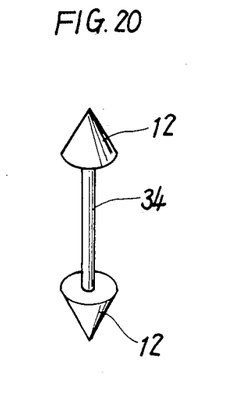

FIGS. 16-18 illustrate the setting structure of this invention, when applied to the looped end part of a pet's leash. Referring to these figures, the binding means body (11) has a notch (31) formed in its middle part and in the upper side setting part (14) separated by this notch (31), a rope setting hole (15) and a first rope passing hole (15a) are formed in parallel to each other. Similarly, in the lower side passing part (32), there is formed a second passing hole (15b). Thus the first and the second passing holes (15a) (15b) may be formed in series, but in this embodiment, they are in the form of being severed from each other. One end of a leash (33) is first, passed through the second passing hole (15b), further passed through the notch (31) to the first passing hole (15a) side, to be projected out therefrom, and then, after folded back in a loop form, as shown in FIG. 16, inserted into the setting hole (15). The wedge (12) used in this embodiment is in a conical shape, as shown in FIG. 20; this wedge (12) is inserted from its tapering end side into the end of the rope (33) inserted in the setting hole (15) and as this leash (33), together with the wedge (12), is strongly pulled upward in the state of FIG. 18, the end part of the leash (33) is strongly pressed onto the inner circumferential surface of the setting hole (15) by the wedge (12), whereby the leash (33) is firmly held, without allowing it to come out. The leash (33) used in this embodiment is the so-called braided rope formed by combining a large number of threads and the wedge (12) may be readily inserted into the end portion of the rope (33) which is in the state of being loosened. FIG. 20 shows other wedges which are to be fitted in the aforementioned first passing hole (15a) and second passing hole (15b), with the bottom sides of this pair of conical wedges (12) (12) integrally coupled by a flexible coupling rod (34); this assembly is inserted into the leash (33) which is in the state of being loosened at the notched part (31), as shown in FIG. 18, so that the respective wedges (12) (12) are inserted in the first and the second passing holes (15a) (15b), thereby securely holding the lash (33) against movement of its intermediate part in its passing direction. Thus the rope (33) is brought into a state of its looped part to form a grip at its end being securely held.

Numeral (35) is a cap covering the aforementioned notch (31), which is fitted into the notch (31) and set with a screw (36). In this caver, a groove (37) is formed in correspondence with the part of the leash (33) which passes the notch (31). Numeral (38) is an engaging means to a pet's collar which is attached to the other end of the leash (33).

Figure 21:
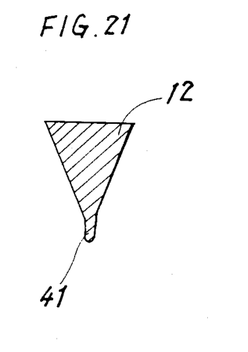
FIGS. 21 and 22 are longitudinal sectional views illustrating other wedges.
Figure 22:
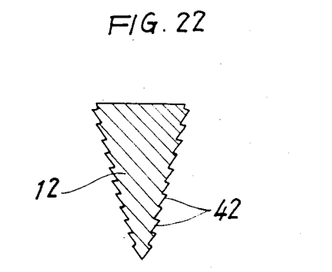
Figure 23:
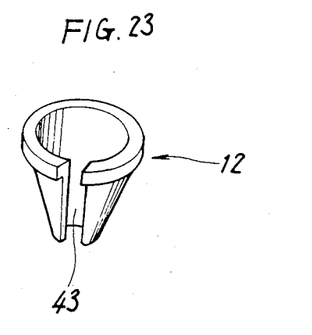
FIG. 23 is a perspective view illustrating a still another wedge.

FIGS. 21-23 show a variety of shapes of the conical wedge, FIG. 21 showing one having a protrusion (41) formed at the tip of the wedge (12) for facility in its insertion. In the wedge (12) of FIG. 22, a large number of fringes (42) are formed on the periphery of the wedge (12) whereby withdrawal of the wedge (12 in the opposite direction to the direction of pulling the leash (33) may be further prevented. FIG. 23 shows a wedge (12) being hollow and formed with a slit (43) cut longitudinally therethrough, so that it may be contracted, as it is pushed into the rope.

Figure 24:
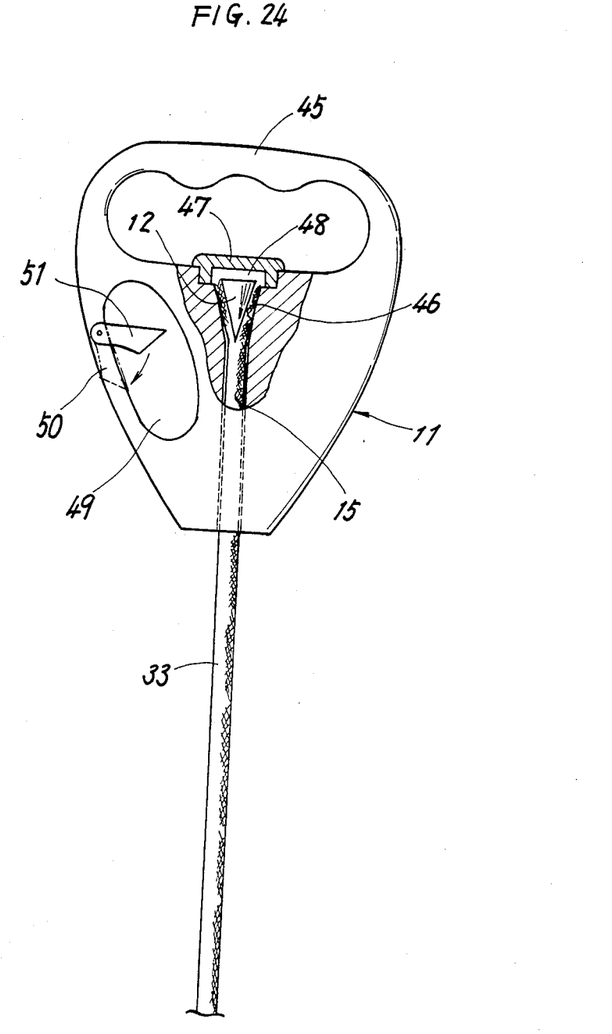
FIG. 24 is a front view in a longitudinal section of the essential part showing another setting structure of a pet's leash.

FIG. 24 shows another embodiment of pet's leash. In this embodiment, a looped grip (45) is formed integrally with and at one end of a binding means body (11) provided with a setting hole (15), whereby the need of bending the leash (33) in a loop form is obviated. The leash (33) is inserted into the setting hole (15) from the opposite side from the aforementioned grip (45) and it is held by inserting a wedge (120 into one end thereof similarly as above-described. In this application, the portion on the end side of the aforementioned leash (33) in the setting hole (15) is tapered (46) along the outer periphery of the wedge (12). Numeral (47) is a cap for covering the end part of the aforementioned leash (33), which is fitted by inserting in the recess (48) formed in the end of the binding means body.

Figure 25:
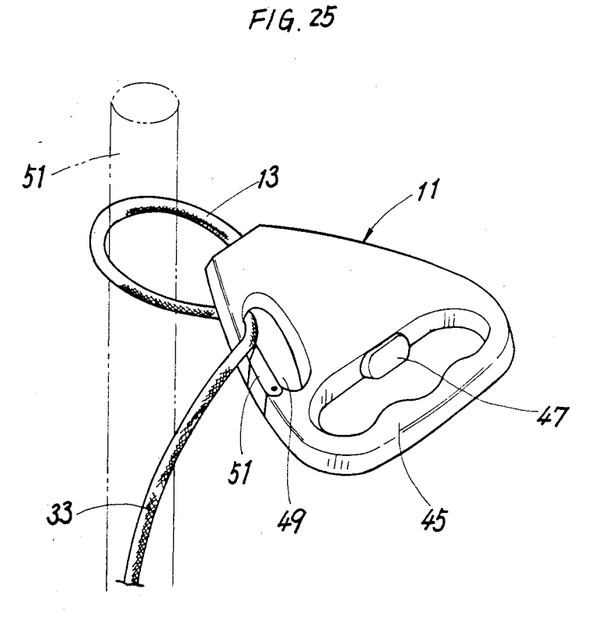
FIG. 25 is a perspective view of the pet's leash used in the structure of FIG. 24, illustrating its state of being in use.

In this embodiment, the binding means body (11) has a leash anchoring hole (49) formed therein; this leash anchoring hole (49) is communicated to outside through an opening (50), said opening (50) being hermetically closed by an open - closable engaging piece (51) which is to open inward. This engaging piece is always urged to close the opening (50) by means of a spring, for example, and is so composed as to be readily opened by pushing in by the engaging portion of the leash (33). FIG. 25 shows the using method of this anchoring hole (49); the leash (33) is wound around a support (51) such as a pillar or a pile whereby it is possible to readily moor it on such a pillar (51), etc.

Figure 26:
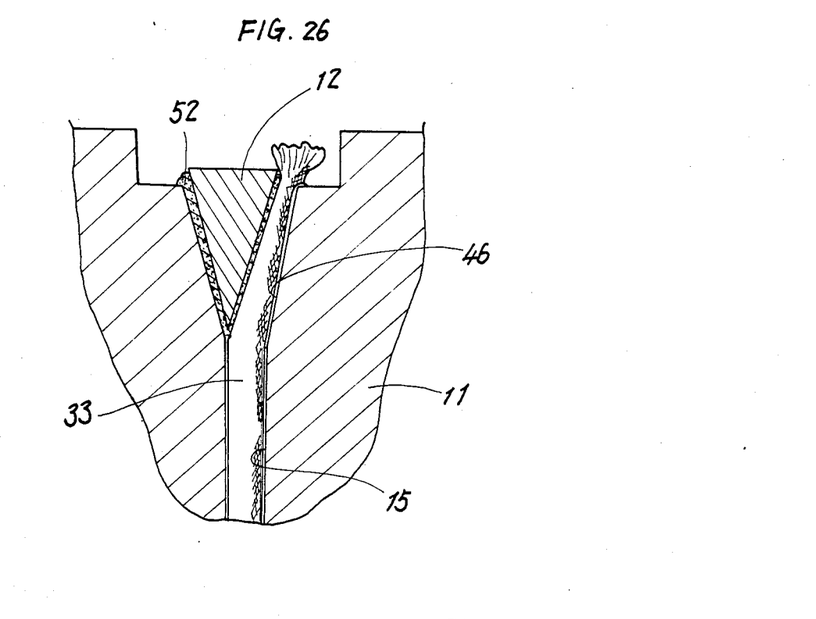
FIGS. 26 and 27 are longitudinal sectional views of the essential part illustrating other examples of the rope setting structure in the pet's leash of FIG. 24.

FIG. 26 shows another setting method by means of a wedge (12) characterized in that the wedge (12) is inserted in one end of a setting hole (15) formed with a taper in the state of being superposed on the outside of the leash (33), not that a wedge is inserted into a rope which is in the state of its end being loosened, so that the wedge press the leash (33) onto the wall side in the state of squashing the rope. Furthermore, in this embodiment, the wedge 12 and the leash (33) are bonded onto the inner surface of the setting hole (15) with an adhesive (52).

Figure 27:
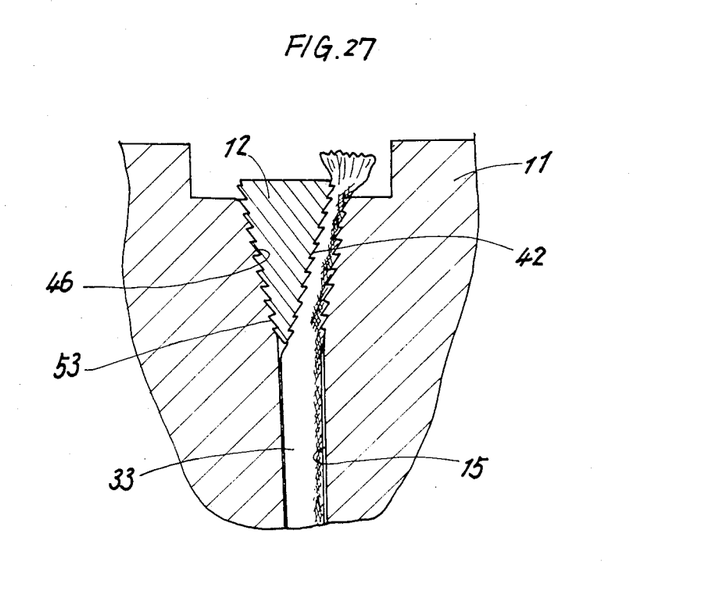

In the binding means of FIG. 27, a wedge (12) having a large number of fringes (42) formed on its periphery, like the one of FIG. 22, is used in a similar anchoring method as represented by the afore-mentioned FIG. 25, and facing these fringes, similar fringes are formed on the tapered portion (46) of the setting hole (15), for them to be engaged with each other, thereby preventing the wedge (12) from coming out in the direction toward its bottom. In this embodiment, no adhesive is employed.

Figures 28, 29:
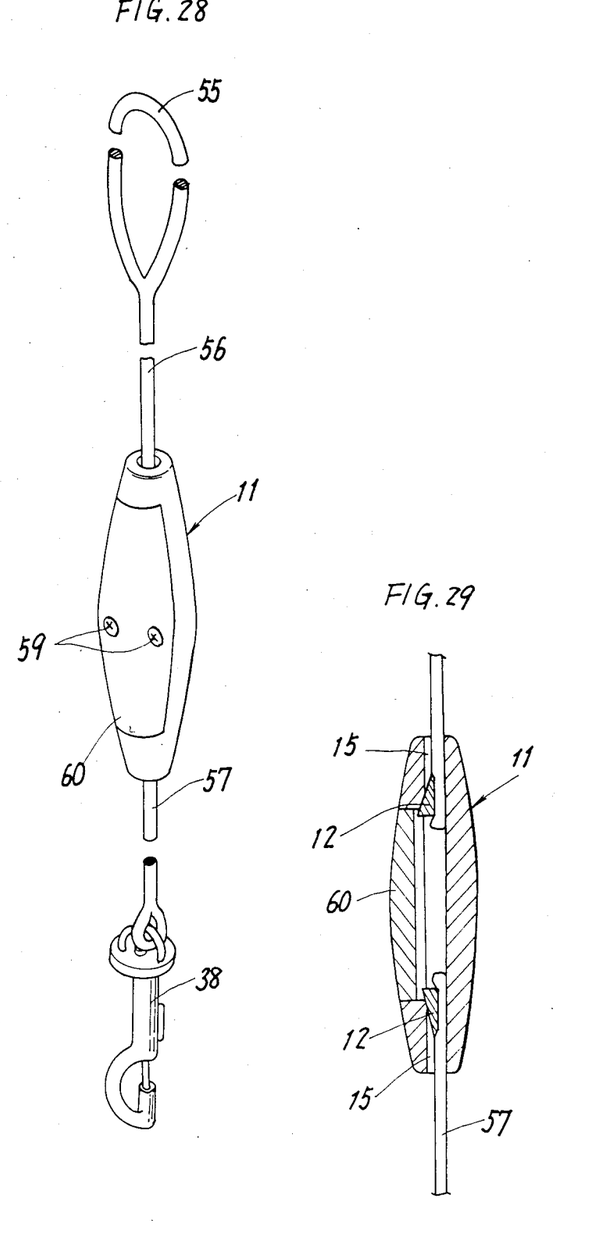
FIG. 28 is a perspective view illustrating another setting structure for a pet's leash.
FIG. 29 is a longitudinal sectional view of the binding means part of the embodiment of FIG. 28.

FIGS. 28 and 29 present a still another embodiment of this invention showing one end portion of a rope (56) provided with a gripping loop (55) and another rope (57) provided with an engaging means (38) to be attached to a pet's collar being inserted from mutually opposite sides into a pair of setting holes (15) formed in a binding means body (11) and respectively set with wedges (12) (12). And an opening (58) for performing the inserting work of these wedges (12) (12) is formed on a side of the binding means body (11) and this opening (58) is covered with a cap (60) fixed with screws (59) (59).

The above-described examples are embodiments of this invention; however, this invention is not limited to these embodiments only, but permits various alternations to be made within its scope of claims hereunder described; thus, this invention will also embrace them.

What is claimed is:

1. A strap setting device for setting a strap, said device comprising:

a binding means body having first and second ends, said binding means body including means at said first end of said binding means body for guiding a strap in a zigzagging manner, a strap passing hole in said second end of said binding means body for guiding and passing a strap, guide means in said binding means body for guiding and supporting a strap between said zigzagging guiding means and said strap passing hole, and a strap setting hole in said second end of said binding means body for receiving and securing a strap;

and a removable wedge removably insertable into said strap setting hole for cooperating with said strap setting hole for securing a strap in said strap setting hole.

2. A device as in claim 1, wherein said binding means body includes first and second sides extending between said first and second ends, and said zigzagging guiding means includes a plurality of cross-linking pieces extending between said first and second sides.

3. A device as in claim 2, wherein said removable wedge is substantially L-shaped.

4. A device as in claim 3, wherein said strap passing hole and said strap setting hole extend substantially parallel.

5. In combination, a substantially flat elongated strap and a strap setting device, said strap setting device comprising:

a binding means body having first and second ends, said binding means body including means at said first end of said binding means body for guiding said strap in a zigzagging manner, a strap passing hole in said second end of said binding means body for guiding and passing said strap, guide means in said binding means body for guiding and supporting said strap between said zigzagging guiding means and said strap passing hole, and said strap setting hole in said second end of said binding means body securing said strap; and a removable wedge removably insertable into said strap setting hole for cooperating with said strap setting hole for securing said strap in said strap setting hole.

6. A device as in claim 5, wherein said binding means body includes first and second sides extending between said first and second ends, and said zigzagging guiding means includes a plurality of cross-linking pieces extending between said first and second sides.

7. A device as in claim 6, wherein said removable wedge is substantially L-shaped.

8. A device as in claim 7, wherein said strap passing hole and said strap setting hole extend substantially parallel.

* * * * *